United States Patent
Tracy et al.

(10) Patent No.: US 8,515,788 B2
(45) Date of Patent: Aug. 20, 2013

(54) METHODS AND SYSTEMS FOR PROVIDING CUSTOMIZED RISK MITIGATION/RECOVERY TO AN INSURANCE CUSTOMER

(75) Inventors: Joseph Tracy, Madison, CT (US); Scott Cornell, Rochester, NY (US); Lauren Berry, Canton, CT (US)

(73) Assignee: The Travelers Indemnity Company, Hartford, CT (US)

( * ) Notice: Subject to any disclaimer, the term of this patent is extended or adjusted under 35 U.S.C. 154(b) by 71 days.

(21) Appl. No.: 12/876,794

(22) Filed: Sep. 7, 2010

(65) Prior Publication Data

US 2011/0137685 A1 Jun. 9, 2011

Related U.S. Application Data

(60) Provisional application No. 61/240,170, filed on Sep. 4, 2009.

(51) Int. Cl.
*G06Q 40/00* (2012.01)
(52) U.S. Cl.
USPC ............................................................. 705/4
(58) Field of Classification Search
USPC ...................................................... 705/35–45
See application file for complete search history.

(56) References Cited

U.S. PATENT DOCUMENTS

| | | | | |
|---|---|---|---|---|
| 7,610,210 B2* | 10/2009 | Helitzer et al. | ................... | 705/4 |
| 7,711,584 B2* | 5/2010 | Helitzer et al. | ................... | 705/4 |
| 2005/0049962 A1* | 3/2005 | Porter et al. | ................... | 705/38 |
| 2005/0055248 A1* | 3/2005 | Helitzer et al. | ................... | 705/4 |
| 2005/0055249 A1* | 3/2005 | Helitzer et al. | ................... | 705/4 |
| 2006/0036473 A1* | 2/2006 | Taylor | ................... | 705/4 |
| 2008/0065427 A1* | 3/2008 | Helitzer et al. | ................... | 705/4 |
| 2009/0265193 A1* | 10/2009 | Collins et al. | ................... | 705/4 |
| 2010/0106533 A1* | 4/2010 | Alvarez | ................... | 705/4 |

OTHER PUBLICATIONS

Purtell, Dan; Rice, James B, Jr, "Assessing Cargo Supply Risk", Security Management, 50. Nov. 11, 2006, pp. 78,80,82-84,86-87.*
Jukka, Ojasalo, "A Model of Risk Management in Globalizing Companies", The Business Review, Cambridge 13. 1 (Summer 2009), pp. 200-209.*

* cited by examiner

*Primary Examiner* — Mohammad Z Shaikh
(74) *Attorney, Agent, or Firm* — Stroock & Stroock & Lavan LLP

(57) ABSTRACT

A loss mitigation computer system includes a customer interface electronically receiving customer information data from a customer computer system via a communications network, a risk assessment computer processing module processing the customer information data and identifying at least one peril associated with the customer information data, a risk mitigation computer processing module generating at least one risk mitigation option based on the at least one peril and receiving customer selected risk mitigation options responsive to the generated at least one risk mitigation option from the customer computer system; and a customization computer processing module generating at least one of a calculated insurance premium, a current risk assessment, a future risk assessment, recommendations, and a gap analysis based on the received at least one customer selected risk mitigation option. Various alternative embodiments are also disclosed, including a computer implemented loss mitigation method and/or loss recovery system.

23 Claims, 13 Drawing Sheets

RISK ASSESSMENT & MANAGEMENT PERIL OF THEFT — CUSTOMER OPTIONS

| CUSTOMER OPTIONS | INFO GATHERING* | RISK ASSESSMENT | RECOMMENDATIONS |
|---|---|---|---|
| 1. ASSISTED/ SYSTEM GENERATED | INFO CAN BE COLLECTED THRU: -ON LINE APPLICATION -ON SITE OR PHONE SURVEY -THIRD PARTY SOURCES | AUTOMATED SYSTEM USES PREDICTIVE MODELING, HISTORICAL EXPERIENCE, THIRD PARTY INFO, ETC TO EVALUATE INFO GATHERING/CURRENT STATE AND POSSIBILITY OF LOSS BY PERIL (AND RISK FACTOR) EXAMPLE- THEFT: FOR THEFT PERIL, SYSTEM REVIEWS CURRENT STATE (INCLUDING CURRENT PROTECTION) FOR THE FOLLOWING RISK FACTORS: •EMPLOYEE TURNOVER •GEOGRAPHIC AREA (HISTORICAL DATA) •HIGH VALUE ITEMS •OFF PREMISE EXPOSURE | SYSTEM CONDUCTS "GAP ANALYSIS" BY PERILS AND PROVIDES RECOMMENDATIONS TO REDUCE OR ELIMINATE PERILS IN AREAS WHERE CURRENT PROTECTION MAY BE INADEQUATE EXAMPLE- THEFT: SYSTEM NOTES "GAP" ON: OFF PREMISE SECURITY, HIGH VALUE LOADS, KEY CONTROL AND EMPLOYEE TURNOVER IN THE NEW DRIVER CATEGORY EMPLOYEE TURNOVER – HIGH; NEEDS IMPROVEMENT RECOMMENDATION: ADDITIONAL SCREEN FOR NEW DRIVERS, TRAINING, ADD KEY INVENTORY CONTROL SYSTEM GEOGRAPHIC AREA (HISTORICAL DATA) – HIGH CRIME AREA; NEEDS IMPROVEMENT RECOMMENDATION: ADD TRACKING & MONITORING – ASSISTED GPS TATTLETALE™ AND/OR PROPERTY REGISTRY AND RECOVERY SERVICE, REGISTRY SERVICE HIGH VALUE ITEMS – PRESENT; NEEDS IMPROVEMENT RECOMMENDATION: ADD LAYERING PROTECTION FOR HIGH VALUE LOADS – CAGE COMMODITIES, ADDITIONAL ALARM PROTECTION OFF PREMISE EXPOSURE – NOT PRESENT |

FIG. 5A

RISK ASSESSMENT & MANAGEMENT PERIL OF THEFT — CUSTOMER OPTIONS

| CUSTOMER OPTIONS | INFO GATHERING* | RISK ASSESSMENT | RECOMMENDATIONS |
|---|---|---|---|
| 1. ASSISTED/ SYSTEM GENERATED | INFO CAN BE COLLECTED THRU:<br>- ON LINE APPLICATION<br>- ON SITE OR PHONE SURVEY<br>- THIRD PARTY SOURCES | AUTOMATED SYSTEM USES PREDICTIVE MODELING, HISTORICAL EXPERIENCE, THIRD PARTY INFO, ETC TO EVALUATE INFO GATHERING/CURRENT STATE AND POSSIBILITY OF LOSS BY PERIL (AND RISK FACTOR)<br><br>EXAMPLE- THEFT: FOR THEFT PERIL, SYSTEM REVIEWS CURRENT STATE (INCLUDING CURRENT PROTECTION) FOR THE FOLLOWING RISK FACTORS:<br>• EMPLOYEE TURNOVER<br>• GEOGRAPHIC AREA (HISTORICAL DATA)<br>• HIGH VALUE ITEMS<br>• OFF PREMISE EXPOSURE | SYSTEM CONDUCTS "GAP ANALYSIS" BY PERILS AND PROVIDES RECOMMENDATIONS TO REDUCE OR ELIMINATE PERILS IN AREAS WHERE CURRENT PROTECTION MAY BE INADEQUATE<br><br>EXAMPLE- THEFT: SYSTEM NOTES "GAP" ON: OFF PREMISE SECURITY, HIGH VALUE LOADS, KEY CONTROL AND EMPLOYEE TURNOVER IN THE NEW DRIVER CATEGORY<br><br>EMPLOYEE TURNOVER – HIGH; NEEDS IMPROVEMENT RECOMMENDATION: ADDITIONAL SCREEN FOR NEW DRIVERS, TRAINING, ADD KEY INVENTORY CONTROL SYSTEM<br><br>GEOGRAPHIC AREA (HISTORICAL DATA) – HIGH CRIME AREA; NEEDS IMPROVEMENT RECOMMENDATION: ADD TRACKING & MONITORING – ASSISTED GPS TATTLETALE™ AND/OR PROPERTY REGISTRY AND RECOVERY SERVICE, REGISTRY SERVICE<br><br>HIGH VALUE ITEMS – PRESENT; NEEDS IMPROVEMENT RECOMMENDATION: ADD LAYERING PROTECTION FOR HIGH VALUE LOADS – CAGE COMMODITIES, ADDITIONAL ALARM PROTECTION OFF PREMISE EXPOSURE – NOT PRESENT |

| | | | |
|---|---|---|---|
| 2. SELF SELECTED | INFO CAN BE COLLECTED THRU: -ON LINE APPLICATION | FOR THIS OPTION, RISK ASSESSMENT IS LARGELY DONE BY CUSTOMER CUSTOMER IS DIRECTED THROUGH OPTIONS TO REDUCE OR ELIMINATE LOSS POTENTIAL BY PERIL<br><br>EXAMPLE - THEFT:<br>FOR THEFT THREE CATEGORIES ARE OFFERED:<br>1. TRACKING, MONITORING, INFO SHARING<br>2. PROTECTIVE HARDWARE<br>3. TRAINING/ EDUCATION/ CERTIFICATION<br>OPTIONS ARE DIFFERENTIATED BY EXPENSE TO ASSIST CUSTOMER IN DETERMINING BEST OPTION CONSIDERING RESOURCES AVAILABLE | ESTIMATED COST - $125 PER UNIT AND TIME INVESTMENT IN TRAINING/SCREENING<br>ESTIMATED REDUCTION IN THEFT PERIL – 85%<br><br>CUSTOMER SELF SELECTS OPTIONS FOR EACH PERIL AND SYSTEM PROVIDES HIGH LEVEL ESTIMATE OF CUSTOMER'S COSTS AND DEGREE PERIL MAY BE MITIGATED<br><br>EXAMPLE - THEFT:<br><u>INSURED SELECTS:</u><br>1. TRACKING & MONITORING – ASSISTED GPS TATTLETALE™, AND<br>2. PROTECTIVE HARDWARE – DISABLING DEVICES, KINGPIN LOCKS<br><br>ESTIMATED COST - $150 PER UNIT PER YR<br>ESTIMATED REDUCTION IN THEFT PERIL – 70% |
| BLENDED | COMBINATION OF 1 & 2 ABOVE | COMBINATION OF 1 & 2 ABOVE | COMBINATION OF 1 & 2 ABOVE |

* INFO INCLUDES LOSS EXPERIENCE, RESOURCES AVAILABLE, LOCATION & OFF PREMISE INFO, EXPOSURE, TRANSIT INFO, INTERDEPENDENCES, ETC.

*FIG. 5B*

Select Parameters for Sting Trailer

Type of Insurance:
- ☐ Small Business
- ☐ Medium Business
- ☐ Large Business
- ☐ Personal Insurance
- ☐ Bond or Surety
- ☐ Other _____

Sting Trailer Type and size:
- ☐ Trailer
- ☐ Truck
- ☐ Car
- ☐ Van
- ☐ Desired size: ___ x ___

Sting Trailer Frequency:
- ☐ One Time
- ☐ Monthly
- ☐ Weekly
- ☐ Quarterly
- ☐ Yearly
- ☐ Other/Custom

Types of Surveillance/Monitoring:
- ☐ Audio
- ☐ Video
- ☐ Location/GPS
- ☐ RFID tags
- ☐ Sensors
  - ☐ Glass breakage
  - ☐ Smoke
  - ☐ Moisture/water/humidity
  - ☐ Motion
  - ☐ Temperature
  - ☐ Other _____
- ☐ Other _____

Custom Features:
- ☐ Color(s): _____
- ☐ Company Logo
- ☐ Blank
- ☐ Other _____

Types of Bait Items/Cargo:
- ☐ Technology/Electronics
- ☐ Fine Art/ Jewelry
- ☐ Pharma/Drug/Health supplies
- ☐ Building supplies/materials
- ☐ General Retail
- ☐ Energy
- ☐ Equipment
- ☐ Other _____
- Item Sizes: _____

Sting Trailer Location/deployment:
- ☐ Location/Region: _____

Figure 9

Loss Recovery Request Screen

Describe items lost or stolen:
_____
_____
Registry/Recovery Services (if any):
_____

Last know location of items (and date/time):
_____
_____

Insured's Contact information:
Cell phone:
Email address:

[ Save ]   [ Submit Request ]   [ Contact Insur. co ]

Fig. 11

Loss Recovery Status Screen

Lost/stolen Item(s)/ Recovery request number: _____

Recovery Status:
- ☐ Initial Request Received from Insured
- ☐ Private Loss Recovery specialists engaged
- ☐ Law Enforcement engaged
- ☐ Dormant Sensing/location technology activated (click for details)
- ☐ Active sensing technology data reviewed (click for details)
- ☐ Loss Items Recovered
- ☐ Insured Notified of recovery

Sensing Technology Status:
The following active or dormant sensors are collecting data on the lost items:
- ☐ GPS
- ☐ Lojack®
- ☐ Others _____

[Tracking Report]   [Real-time Tracking Data]

Fig. 12

METHODS AND SYSTEMS FOR PROVIDING CUSTOMIZED RISK MITIGATION/RECOVERY TO AN INSURANCE CUSTOMER

CROSS-REFERENCE TO PRIOR APPLICATIONS

This application claims priority to U.S. Provisional Application Ser. No. 61/240,170, filed on Sep. 4, 2009, which is incorporated by reference herein in its entirety.

BACKGROUND

Businesses continuously face the risk of loss to their property from various sources when on and off premise, storing and shipping goods. Inland marine insurance is insurance that indemnifies loss to moving or movable property or property that just involves an element of transportation. The property (or goods) that is/are insured under inland marine coverage is typically one or more of the following: property actually in transit; property held by a bailee; property at a fixed location that is an instrument of transportation; and/or a movable type of goods, property or equipment, that is often at different locations. Some of the different types of coverages typically called "inland marine" are as follows: Accounts Receivable; Bailee Customer's Goods; Builders' Risk; Communication Towers and Equipment; Computer Coverage; Contractors Equipment; Commercial Floaters; Dealers; Exhibitions; Fine Arts; Furriers ; Golf Equipment; Installation; Jewelers; Leased Property; Medical and scientific equipment; Mobile Equipment; Motor Truck Cargo; Museums; Musical Instruments Processing Risks; Rigger's; Liability; Scheduled Property; Transportation; Trip Transit; Valuable Papers; Warehouse Legal; and/or any other goods and/or any other coverage associated with the aforementioned goods or property and/or the liability coverage associated therewith, as described in www.imua.org and http://www.roughnotes.com/pfm/100/140_0100.HTM, the information of which are hereby incorporated by reference.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

FIGS. 5a and 5b show a chart listing several steps in assessing and managing risks according to an embodiment of the present invention.

FIG. 9 shows a chart showing various sting trailer options according to an embodiment of the present invention.

FIG. 11 shows a screen shot of a loss recovery services option according to an embodiment of the present invention.

FIG. 12 shows a screen shot of a loss recovery services option according to an embodiment of the present invention.

DETAILED DESCRIPTION

Figure 1:
FIG. 1 shows how embodiments of the invention integrate various technologies and expertise/services.

FIG. 1 shows that the customer is the focus of the inland marine network, and that each of SIG (special investigations group), risk control, operations, actuarial, underwriting, and claims, are focused on reducing the customer's risk of loss. FIG. 1 also shows how embodiments of the invention integrate technology and expertise/services from multiple business units and/or third parties to reduce the risk of loss (e.g. due to crime, theft, fraud, weather, natural disasters/catastrophes, transit perils, fire/smoke, water damage, mechanical/electrical problems, or any other peril or reason) to an insured's (customer's) goods.

Areas of expertise corresponding to embodiments that the invention can provide include, the causes of loss (or perils) that can be mitigated, the lines of business the systems and methods can be applied to, and the network tools that can be used to achieve the desired results. The areas of expertise include risk control, SIGs, claims, underwriting, operations (back-office support, customer service, processing, and administration, including billing, coding, and IT systems related to policy issuance/delivery, endorsements, and billing), and actuarial/modeling (as discussed hereinbefore). The risk that can be mitigated include theft, transit perils, storage perils, fire/smoke, water damage, catastrophic perils, mechanical or electrical problems (e.g. system failure, malfunction, and/or surges), and corresponding business process deficiencies, or any other peril that affects the integrity of property or goods.

The invention can be beneficially applied to all lines of business that can benefit including Motor Truck Cargo, Contractor's Equipment, Fine Art, Builder's Risk (BR) (covering buildings under construction prior to completion)/Installing systems (Install) (e.g. HVAC, plumbing, electrical, and the like), typically related to specialty contractors, Jewelers Block, Property, Warehouse Legal Liability (liability related to accepting goods of others; e.g. bailment), Electronic Data Processing (e.g., computer equipment, hardware, software, accessories, etc.), and Renewable Energy (e.g., equipment, property, and/or liability associated with solar, wind, and/or geothermal energy) or any other line of business associated with Inland Marine or property and casualty insurance generally. The network of tools that can be used include Industry/Peril-related Certifications, Predictive Modeling, Government Alliances and Unbundled Services including (e.g. Travelers Theft Monitoring Services).

Embodiments of the invention can be incorporated into a web based computer system accessible over the Internet that electronically communicates with computer systems of other business units and/or third parties. By linking collected and historical information, and analyzing it with respect to an insured's business, embodiments of the invention can help the customer reduce their risk of loss. By reducing a customer's losses, the finances of the customer's business are improved.

Further, by reducing the total cost of losses, an insurer can afford to reduce premiums, and further improve the customer's finances. The embodiments described herein can be applied to any area of insurance, including, but not limited to property and casualty insurance and inland marine insurance.

Figure 2:
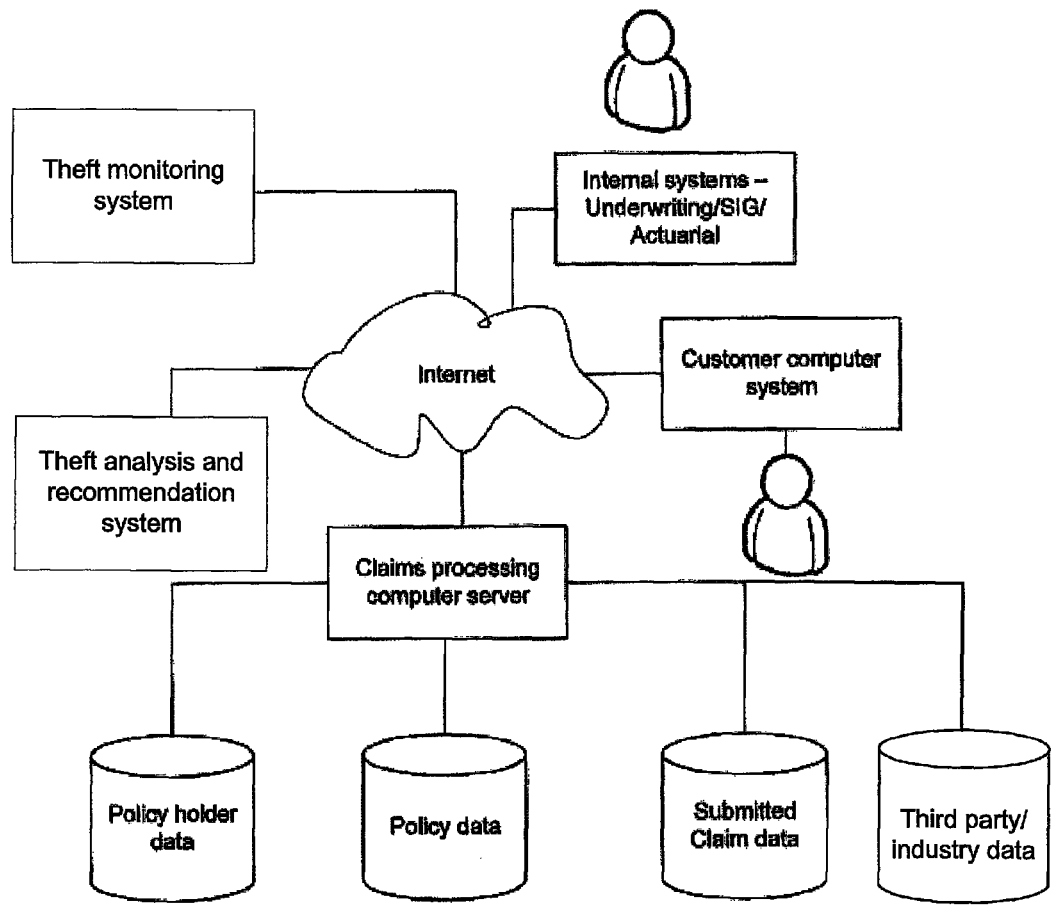
FIG. 2 shows the connectivity of areas of expertise using an embodiment of the invention.

FIG. 1 also shows how a computer system executing embodiments of the invention can integrate: (1) claims information—this describes current and past claims from multiple customers, including claims of loss because of theft, crime, and natural disasters; (2) operations expertise—which includes back-office support, customer service, processing, and administration, including billing, coding, and IT systems related to policy issuance/delivery, endorsements, billing, and the like. This also includes best practices knowledge and resources such as IT infrastructure, software, programming, and redundant systems which enable embodiments of the invention; (3) underwriting expertise and system—this includes a connection to underwriting systems used for pricing insurance policies and determining premiums (4) risk control—systems that can be used for risk control, mitigation, and prevention, such as assessments, and research; and (5) SIG (Specialty Investigation Group)—this is a group of investigators, engineers, technicians and analysts focused on investigations of crime or theft or fraud, and (6) actuarial/modeling—systems for analyzing data and predicting trends and likelihood of loss FIG. 2 shows a system diagram showing embodiments of the invention connected to other servers and systems inside and outside the insurer. The theft and/or risk analysis and recommendation system is connected to the other systems through the Internet, or a corporate network. The theft and/or risk analysis system is connected to a claim processing system and server that is connected to databases of policy holder data, policy data, and submitted claim data that can be analyzed. As shown in FIG. 2, a customer may access various features of an embodiment of the present invention by logging-in via its customer computer system.

Embodiments of the invention can also utilize traditional "artisan" underwriting with cutting edge technology and predictive modeling to more accurately assess risk, and accordingly, price insurance premiums. Predictive modeling can utilize information such as claim data, shipping routes (current and/or desired), business type, etc. to more accurately predict a customer's risk of loss.

For example, predictive modeling components can analyze a customer's current or desired shipping routes and determine which routes are more likely to experience loss, particularly with respect to certain types of goods. A new route can be suggested for the customer with less risk, and/or premiums can be adjusted appropriately based on the desired route. Similarly, for warehousing of good, information about locations, including crime and weather trends can be used to determine which locations are more likely to experience loss, particularly with respect to certain types of goods/property. Also, information about tracking devices, locking, and packing items may also be provided. Further, different or upgraded storage facilities can be suggested.

As another example, a customer's current exposures, values, claims information, current protection, etc. can be proactively monitored by a monitoring component of the invention, and based on certain conditions, the customer can be notified that they may want to increase security. Monitoring to estimate a customer's current exposure also allows recommendations to be provided to minimize the exposure. The monitoring component may notice that a claim for a third loss due to theft has been filed by a customer within a certain time frame (e.g. 3 months), the customer can then be proactively notified (e.g. through a website, email, text/SMS, phone call, or letter) that they may want to consider improving security. Along with the notification, one or more forms of theft and/or risk mitigation measures can be suggested, such as a sting trailer, or a be on the lookout intelligence information bulletin ("BOLO") regarding potential theft intelligence/information sharing bulletin issues, risks of loss and law enforcement intelligence and associated loss prevention measures. Any other theft and/or risk mitigation measure that provides the desired results or functions described herein can also be used. These theft and/or risk mitigation measures can be customized by the insurer and/or the customer based on the customer's business and theft concerns.

In one embodiment, the invention includes the deployment of a "sting trailer". A sting trailer, as discussed herein, refers to a vehicle, trailer and/or cargo payload that has been modified or customized in its construction and/or deployment for the purpose of catching thieves. For instance, one embodiment of a sting trailer may include a truck and trailer that are outfitted with covert surveillance and tracking equipment (e.g. video, audio, location (GPS), and other sensors) and are strategically parked at a location having high rates of cargo theft. The sting trailer may be deployed with the cooperation of law enforcement personnel so that when the thief "takes the bait" and steals the vehicle and/or cargo, law enforcement can take immediate action. Alternatively, by modifying the cargo to be readily trackable (e.g., using identification markings like barcodes, radio frequency identification (RFID) tagging, or GPS tracking), the thief can be allowed to return to a central repository (e.g. a warehouse) and even commence distributing the stolen goods prior to taking action in order to learn more about the thief's network and operation. A sting trailer according may be deployed to test or enhance supply chain integrity en route. In other embodiments, the sting trailer may take the form of marked cargo that has been placed in an area of questionable theft. In that case, a sting trailer may test and/or enhance supply chain integrity at various destinations, at the ends of a route, and/or at distribution hubs, where the goods may not customarily be kept in trailers or on trucks. These sting trailers may be used by insureds or law enforcement pre-loss (before a loss to prevent thefts from occurring) or post loss (after a crime has occurred to determine what caused the loss and to deter future crimes/losses).

Pro-active monitoring (e.g. training and processes) helps reduce the risk that a customer will even experience a loss. By monitoring claim data of one or more customers of the insurer, patterns can be determined that can be used to predict when improved theft and/or risk mitigation measures should be implemented for a particular customer. For example, if the number of claims for theft at a certain port increased by 10% one year, the system can recommend appropriate theft and/or risk mitigation upgrades for all customers using that same port and/or selling the same type of goods. This pro-active recommendation can prevent any losses at the customer.

Along with the notification, the customer can also be offered training on loss prevention and reduction. This training may also help the customer reduce the risk of loss by educating them on the various theft and/or risk mitigation measures available and their use. This can include those controls and tracking systems that can be used with shipping containers, property and equipment on and off premises, or in warehouses, and can be used to track theft or provide alerts on possible thefts. The training can be provided on an as-needed basis, or proactively through the establishment of certification programs.

According to an embodiment of the present invention, areas of expertise that can be used to reduce a customer's risk of loss include one or more of: risk assessments for clients, advocacy and input into legislation/policies, training for insured's, theft assessment, task force involvement, industry and law enforcement personnel, having inland experts well versed on client's business operations, developing industry recognized certification for personnel, developing industry recognized certification for products and services, providing advanced product lines and services (e.g. hot site, cold site, high value property relocation, salvage, theft monitoring, security products, and the like) by insurer or third parties. Technology that can be used to reduce a customer's risk of loss include a sting trailer utilization pre and/or post loss by insureds and law enforcement, security related vendor alliances, products tested by the insurer, communication focused for early response & information sharing, predictive modeling, software backup and storage, identity theft protection services, telematic, biometric and sensor technology. Certain products and services may be specific to a region or location.

Embodiments of the invention provide analysis of current protections and loss assessments. This can be used to identify gaps, provide recommendations in closing gaps, and potentially reduce loss. Additionally, the risk assessment can be utilized to more accurately predict the risk of loss and price insurance premiums. The information and results of the risk assessments can also be used to adjust legislation and/or policies affecting the risk of loss. For example, that increased police patrolling is needed in certain areas, or at certain times. The information learned from analyzing claim data and assisting customer's with reducing the risk of loss can also be used to help train industry and law enforcement personnel. Embodiments of the invention can also be used to help develop experts who understand a client's business operation, thereby building a relationship with the customer and providing further insights regarding the specific needs and concerns of the client's business.

Embodiments of the invention also include predictive modeling as described above to help predict theft/loss and/or fraud. Embodiments of the invention can also include software backup and storage. This can be used to ensure that the risk mitigation technologies can continue to operate in case of power or communication outages. Further, even in the case of server failure, the software could continue to operate from another redundant server and set of system, or be quickly restarted on another system.

Embodiments of the invention can also be used to certify insured's personnel or products and services. For example, embodiments of the invention can be used to certify personnel that have been trained and are knowledgeable about the latest security technology and risk mitigation methods. The number of such personnel working for a customer can be used to more accurately price risk for the customer and/or offer premium discounts. There may also be certification levels, e.g., silver, gold, platinum, or e.g., foundation, elite, etc. that may correspond to premium discounts or other benefits for the insured. Similarly, embodiments of the invention can be used to certify products or services that have been shown to reduce the risk of loss. For example, a sting trailer with certain features and capabilities could be certified that have been shown to reduce theft and/or catch thieves. Therefore, other insurers or businesses desiring proven technology that can mitigate risk can purchase the certified products and services. In addition, an insurer can directly sell such certified products and services in addition to insurance. These certifications are made possible by embodiments of the invention, which are capable of providing data and information that can be used to verify the effectiveness of certain products and services.

Embodiments of the invention can allow the insured to subscribe to a number of news feeds, crime reports and alerts, and periodic product and service offers that increase awareness of opportunities to proactively control risk.

Embodiments of the invention also include setting up hot sites and cold sites. A hot site is a site that is ready to be used in case a customer's business is interrupted (e.g. from a natural disaster). The hot site can contain telephones, computers, printers, desks, etc. Therefore, hot sites can be used to avoid a business interruption. Cold sites are ready to be set up and used by a business, for example, an empty floor of an office building. These sites can help reduce a customer's risk of loss when a natural disaster or other event occurs. In addition to reducing risk of loss when an event occurs, these facilities may be used as preemptive measures to anticipate possible loss. For example, if a natural disaster such as a hurricane, wild fire, etc. is forecasted for the area, these facilities may be used to move property out of the path of the natural disaster. This would allow possible preemptively anticipating and reducing loss.

Embodiments of the invention can also include pre-planning for property locations. For example, high value property that is located in a shipping yard can be moved to a more protected facility in the event of a natural disaster (e.g. temperature controlled warehouse), or other delay in shipping the goods. These relocations can be used to reduce the loss the customer experiences in view of an unexpected event. The relocations can be planned in advance, so that when needed, they can be quickly implemented. Embodiments of the invention can be used to track and monitor good as they are relocated. This ensures that the insurer's data is complete and updated.

Embodiments of the invention can also include increasing the salvage value of goods. These may be goods that were vandalized, damaged during a theft, or damaged by water/fire/smoke or by other perils. The goods may be salvaged by being sold directly by the insurer, reducing the need for brokers and other middlemen, and thereby increasing the salvage value of the goods. By increasing the salvage value, the customer's loss can be reduced, which can also lead to reduced premiums.

Embodiments of the invention also include security related vendor alliances and products tested by the insurer. For example, the insurer can determine the best product to detect water inside a storage warehouse. By alerting the customers of this situation, they can move their goods and avoid any damage. For example, embodiments of the invention can recommend one of many possible detection systems for a customer's particular storage facility. Similarly, as described above, products can be certified by the insurer. This lets the customers know that they can use the product to reduce their risk of loss.

Embodiments of the invention can also include identity theft detection and protection services. For example, goods may be stolen that contain credit card or other identifying information. Embodiments of the invention can be linked to systems that can be automatically enabled in response to the theft (e.g. cancel credit cards). In this way, the customer, or their clients, can automatically be protected as soon as the insurer is notified of the event, either through sensors, alerts, or a claim filed by the customer (e.g., using a cell phone or PDA). Embodiments of the invention can also include providing current telematic (GPS or the like), biometric, and sensor technology to aid in loss reduction. For example, in some embodiments of the invention, the data generated can only be accessed after proper authorization is provided.

Further embodiments of the invention can include the following products and services: Internal accounting and inventory procedure audit and review, including registering equipment on the National Equipment Register; transportation procedure audit and review (e.g., promote best practices, such as plastic-seal coverings of goods, use of self-locking cable and metal straps, as needed); third party collaboration and consultancy recommendation and facilitation (e.g., coordinate efforts with marine surveyors, environmental analysts, investigators and technicians); the implementation of a product component-centric theft prevent system based on the risk of shipping the entire products (e.g., assess risk based on rare or valued components of goods, such as copper from electrical items and pseudoephedrine from cold medications, or the uniqueness of the goods, such as art and antique cars); and customer service experience enhancement (e.g., priority claim handling, designated representative, etc.).

Embodiments of the invention also include using technology to better monitor warehoused goods. For example, a water sensor can be installed in a warehouse where do are being stored. Any other sensor that provides the desired results or functions described herein can also be used. In the event that water enters the location (e.g. flooding, heavy rains, leaking pips), the sensors can detect this condition and alert the insurer before much (or any) damage occurs to the good. Multiple sensors can be used in the same warehouse (e.g. one per floor) and linked together wirelessly. The multiple sensors can also be linked wirelessly to a central monitoring system on or offsite.

Figure 3:
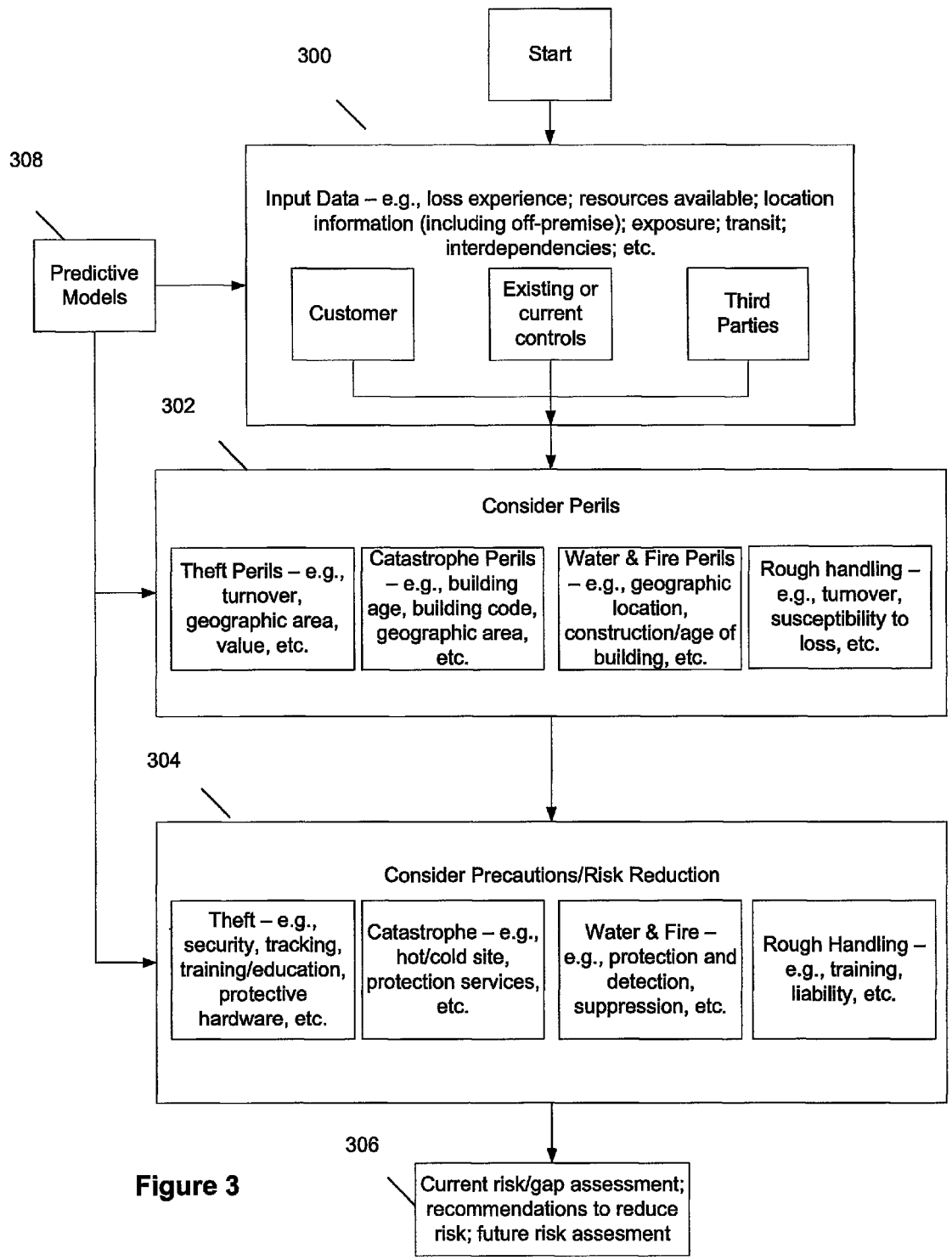
FIG. 3 shows a flow chart for assessing and mitigating risks (including providing recommendations to fill gaps) according to an embodiment of the embodiment of the present invention.

FIG. 3 shows a flow chart for assessing and mitigating risks (including providing recommendations to fill gaps) and calculating an insurance premium in accordance with an embodiment of the present invention. According to an aspect of the present invention, the method shown in FIG. 3 may be implemented via a computer network. At 300, data is obtained by the insurance company. The data may be obtained from customers, third parties, or may already be in the possession of the insurance company. Obtaining information from customers may include results of applications (e.g., on-line and paper) and surveys (e.g., on-site, phone, on-line, etc.) The party sources may include ISO, credit bureaus, catastrophe mapping/modeling companies, etc. Some of the information obtained by the insurance company may include loss experience (e.g., cause of loss, location of loss, description of loss, amount of loss, etc.), resources available (e.g., risk/theft management, in-house training, etc.), location and off-premise information (e.g., address, building age, current protections, construction, occupancy, contracts, owned/leased, etc.), exposure (e.g., values transported, how transported, mileage, range, etc.), and interdependencies (e.g., between suppliers, distributers, third parties, potential for interruption, loss, etc.).

This information may be used to consider various different types of perils for which insurance is sought (shown as 302). Some perils may include, theft, water and fire damage, catastrophes, spoilage, rough handling/transit, collapse, perils requiring back-up/disaster recovery, mechanical and electrical breakdown, etc. Each peril may include various associated risk factors that are considered by the insurance companies. For example, in considering theft perils, the insurance company may consider factors such as employee turnover, geographic area, value of items, off-premise exposure. For water and fire damage perils, the insurance company may consider factors such as geographic location, fire protection and detection, construction, building code, susceptibility of property loss, etc. For catastrophic perils, the insurance company may consider factors such as construction and age of facilities, building codes, presence of hot and cold sites, co-dependencies, susceptibility to property loss, back-up systems, etc. For spoilage perils, the insurance company may consider factors such as construction and age of facilities, cooling systems, temperature monitoring systems, existence of hot and cold sites, susceptibility to spoilage due to temperature change, back-up systems, etc. For rough handling and transit perils, the insurance company may consider factors such as vehicles and drivers used, packing of the goods, employee training and turnover, third party carriers used, susceptibility of property loss, etc. For collapse perils, the insurance company may consider factors such as construction and age of the facilities, modifications to the facilities, geographic location, etc. For perils that require back-up/disaster recover, the insurance company may consider factors such as occupancy, operational sensitivity to down-time, etc. For mechanical and electrical breakdown perils, the insurance company may consider factors such as age of equipment, manufacturer and warranty information, maintenance information, susceptibility to wear and tear, etc.

Next, in addition to the perils and the various associated risk factors, the insurance company may consider the precautions and the risk reduction factors that are implemented by the customer (e.g., current level of risk protection) (shown as 304). This may include security, training, education, protective hardware, telematics, hot/cold sites, protection systems, monitoring systems, suppression systems, etc. For each of the information that is processed, the insurance company may utilize predictive modeling 308 to improves its processing of the information. This information may be used to assess and mitigate risks, provide recommendations to fill gaps, perform risk assessments of future risks, calculate an insurance premium (306) for the customer, issue a policy, etc.

Figure 4:
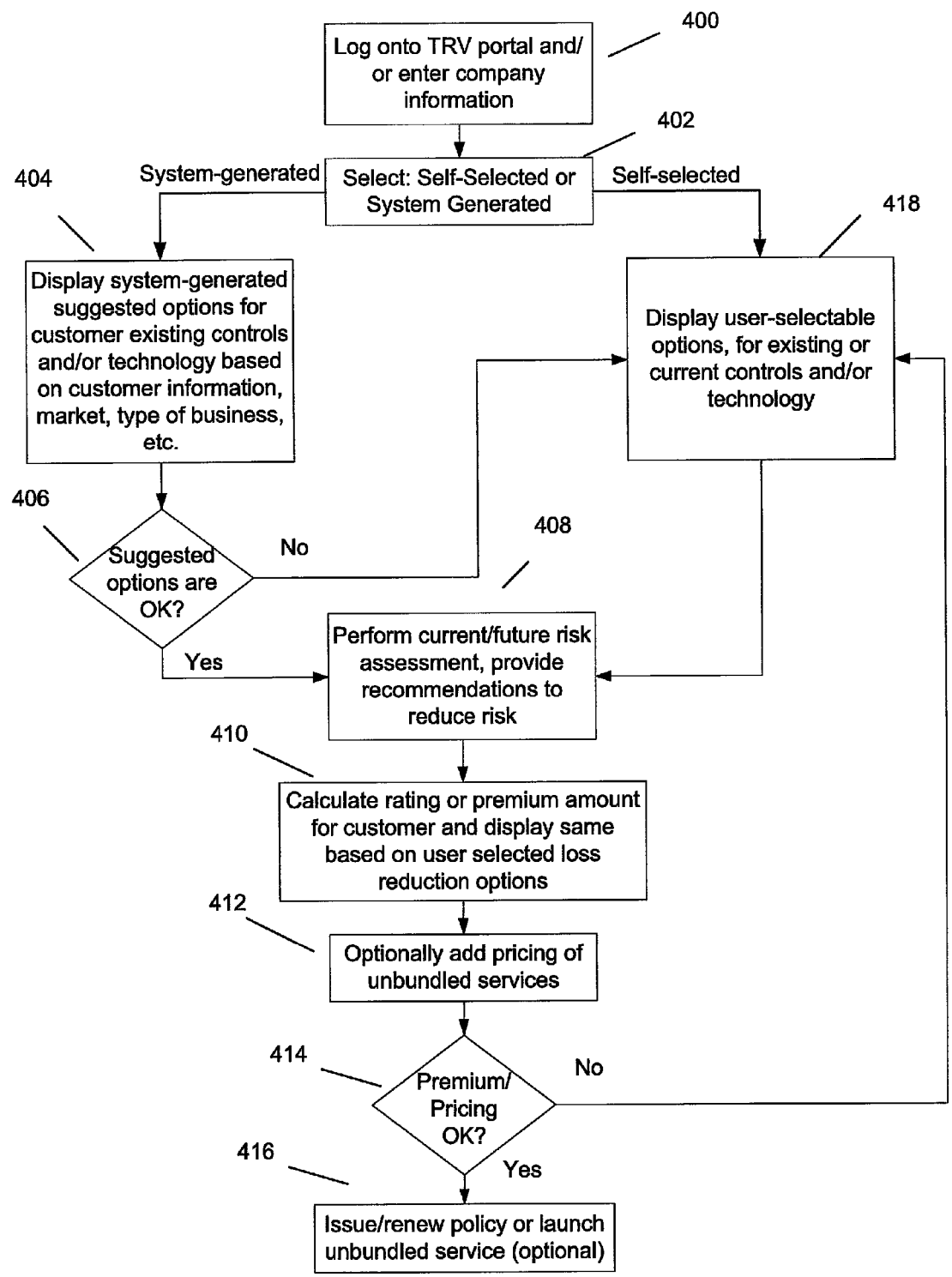
FIG. 4 shows a flow chart for managing risks and issuing a policy according to an embodiment of the present invention.

FIG. 4 shows a flow chart according to an embodiment of the present invention implementing customized risk mitigation expertise/services and technology for a particular customer, and how these can reduce a customer's premium. The customized risk mitigation services allow for reductions in estimated risk and exposure to loss. This in turn could translate into premium savings. FIG. 4 shows an embodiment of the invention directed to offering a plurality of theft and crime prevention devices and services to an insured over the Internet (e.g. through a website). The insured can select one or more of those crime prevention methods discussed herein to use with their products during shipping and storage. The selected crime prevention methods themselves can also be customized during the selection process with corresponding reductions in the insured premiums being provided to the insured. In some embodiments of the invention, the customer self selects the desired services/technology, or the system can provide suggestions to the customer based in recommending one or more crime prevention techniques appropriate to the insured business, and likely to reduce crime the most. This can be accompanied by a premium discount for the insured. In some embodiments, the selection of crime prevention methods by the insured can be tied back to underwriting and used to more accurately price premiums, which may be changed for an insured at renewal periods. In some embodiments, where the risk of loss is high, if the customer does not select a certain minimum level of protection, a surcharge may be applied to the customer's premium. It can also be used for pricing new insureds.

More specifically, FIG. 4 shows that a customer can log on to an insurer web portal (400) and enter information about their business (e.g. type of business, good to be shipped, routes to be used, location and characteristics of storage facilities and intermediate transportation hubs), or if this is an existing customer, the insurer may simply log-in and the system will display the customer's specific information about his business, with an option to edit to change any information (400). The customer can also select whether they would like to select particular theft prevention expertise and technologies, or whether the system should automatically select what it considers the best features based on the customer's information (402). These features can be those shown to effectively reduce the risk of loss, and correspondingly provide the maximum premium reduction to the customer. In some embodiments of the invention, predictive modeling provides the underlying mechanism for providing the automatic selection. In some embodiments of the invention, the customer can toggle between the automatic selection and the manual selection modes to arrive at a final selection of products and services. As shown in FIG. 4, if the customer were to select the self-selected option, user selectable options for expertise and/or technology would be generated and displayed (418). In one embodiment, this may include a "cafeteria-menu" permitting the customer to select from all available options. Based on the customer's selections, risk assessments (current and future) and recommendations for reducing risk can be provided to the customer (408). Based on these assessments and recommendations, a premium can be calculated (410). Optionally, the customer could add a variety of unbundled services (412). Based on these customer selections, once the premium and/or the pricing is approved (414), the policy is issued or renewed or optionally unbundled services may be launched (416).

Also shown in FIG. 4, in addition to the self-selected option, the customer may select a system generated option. Here, the system would generate suggested options for expertise and technology (404). These system generated options may be a subset of the "cafeteria-menu" list provided in the self-selected option. These system generated options may be generated by using predictive modeling and the information discussed above with respect to FIG. 3. Specific implementations are further discussed with respect to FIGS. 5-9. If the suggested options are acceptable to the customer (406), risk assessments (current and future) and recommendations for reducing risk can be provided to the customer (408). Based on these assessments and recommendations, a premium can be calculated (410). Optionally, the customer could add a variety of unbundled services (410). Based on these customer selections, once the premium is approved (414), the policy is issued or renewed (416).

Embodiments of the invention provide products and services, as described above, in a cross-referenced or related manner. The customer can select the desired combination and configuration of products and services. The system, however, may include precautionary measures to ensure that the customer receives a sufficient minimum amount of support for a particular product and service based on the customer's training, certification and familiarity with the product or service, as determined from the customer information. For example, if the customer selects the deployment of a product (e.g. the Sting Trailer), the system may prompt the customer to select a minimum level of additional products and services that would be required to effectively utilize the product (e.g. an amount of technical analyst time, and collaboration with law enforcement).

If the customer indicates the system should select the theft and/or risk mitigation features, then the system presents suggested options for the customer using the relevant expertise and known available technologies, in accordance with the customer's entered information. The customer can also indicate a desire for the system to partially select the theft and/or risk mitigation features by selecting an automated selection option for that feature (e.g. leaving a selection field blank). The customer can then accept one or more of the suggested features. An updated premium amount (e.g. a discount) can be calculated based on the customer's selection. The customer can accept the premium and a policy can be issued (or renewed). If the customer does not accept the new premium, they can change their selections of theft and/or risk mitigation features and have a new premium calculated.

If the customer indicates they would like to select the theft and/or risk mitigation features, then all, or a subset based on the customer's entered information, can be shown to the customer for their selection and customization. For example, the customer may select a sting trailer, but not desire that it have real time tracking capabilities. The customer then selects the theft and/or risk mitigation features and options they desire. Based on this an update premium is calculated and shown to the customer. As described above, the customer can accept this new premium, or change their selections and have a new premium calculated. Once the customer accepts the premium an insurance policy can be issued (or renewed).

Various expertise and technology can be used to reduce a customer's risk of loss. The first part of the process includes assessing the client. This can include collecting information about the customer's claims and collecting information about their business and needs. The second phase of the process includes developing a risk plan with the client. This can include customization of various theft and/or risk mitigation features by the client and/or the system. As described above the system can provide various suggestions. The third phase of the process includes developing a loss plan. This can include planning on how to respond to a loss. For example, using a hot site or a cold site, or selling salvage goods in a certain manner as discussed herein. The arrows show that the process of reducing a customer's risk can be an iterative one that involves assessing the customer, the generating risk and loss plans, implementing those plans, determining the effectives of those plans, and determining if further theft and/or risk mitigation measures are needed, e.g., this may occur if the customer's exposure changes or the customer incurs claims, these phases may be repeated.

In further detail, in phase one (information gathering), the insurer gathers information on the customer's operation, including unique risk exposures and current level of protection against loss. A review is done of: on-site, off-site, adjacent and contingent loss exposures, public and private protection, as well as, training and accountability of staff to prevent or mitigate loss. Information is also gathered on where the business is heading, business plan, future contracts/relationships and potential loss exposures. An in depth analysis is also done on customer's loss history. Information gathering can be done on new customers, existing customers or prospective customers.

Phase two utilizes the gathered information to perform a risk assessment. The technology and expertise that can be used to accomplish the assessment phase include (1) theft & risk assessments-questionnaires and on-site visits (possible service areas include, e.g., SIG, UW, Risk Control); (2) research on partners and public and private protection including product data from engineering/hygiene lab; (3) proprietary predictive modeling systems which utilizes risk characteristics, loss protection, loss history, industry (& proprietary) info to assess risk and potential loss exposures (possible service areas include, e.g. SIG, UW, Risk Control, Actuarial, Claims); and (4) Option for "self service" automated assessment or utilization of "in person" network resources (possible service areas include, e.g., All areas). Accordingly, this information is processed to obtain analysis of current protections, identification of gaps, identification of current exposures, etc.

Phase three is risk management plan development in order to generate recommendations. In phase three, the insurer gathers results from the assessment and develops recommendations and/or a risk management plan in conjunction with the customer. The plan takes into account current and future loss exposures. The plan also provides risk management options to prevent or reduce future losses from a wide array of perils. The plan is tailored to individual customer and includes engagement level (and contact names) for each branch and member of the inland marine network.

The technology and expertise that can be used to accomplish this include one or more of the following: (1) training for insureds personnel or vendor partners (possible service areas include, e.g., SIG, Risk Control, Claims); (2) certification for insureds personnel (possible service areas include, e.g., SIG, Risk Control, Claims); (3) vendor products & services which are tested and certified by Travelers with a positive history of loss reduction.(possible service areas include, e.g., SIG, Risk Control, Underwriting); (4) proprietary products & services such as hot sites, cold sites, high value property relocation, security monitoring & products. (possible service areas include, e.g., SIG, Risk Control, Underwriting); (5) option for customer involvement and advocacy in policy setting and legislation in field of interest. (possible service areas include, e.g., SIG); (6) sting trailer utilization for insured or in partnership with law enforcement (possible service areas include, e.g., SIG); (7) software backup & storage services (possible service areas include, e.g. Risk Control, UW, Claims); (8) identify theft protection services (possible service areas include, e.g., SIG, Risk Control, Underwriting, Claims); (9) telematic, biometric and sensor technology to aid in loss reduction (possible service areas include, e.g., SIG, Risk Control, Underwriting, Claims); (10) quick policy and endorsement turn around with policy conditions that are easily understood (possible service areas include, e.g. Operations, Underwriting); and (11) contact list of network partners for each individual customer with agreement on engagement level (possible service areas include, e.g., All areas).

Phase three of the process also may include the insurer offering a host of options to mitigate loss if a claim should occur. Options center on claims handling, recovery and salvage; however, other options may also be used.

The technology and expertise that can be used to accomplish this include (1) a network of inland dedicated claims professional experts adjusting and appraisals in various industries and product lines (possible service areas include, e.g., Claims); (2) 24/7 claims assistance, focused on immediate response and information sharing (possible service areas include, e.g, Claims); (3) options for proprietary salvage, towing and related services which provide customer savings through loss reduction (possible service areas include, e.g., Claims); (4) manufacturer alliances to provide reduced replacement equipment and parts resulting in customer savings (possible service areas include, e.g., Claims); and (5) sting trailer and SIG utilization for recovery. (possible service areas include, e.g., SIG).

FIGS. 5a and 5b are a charts showing risk assessment and management of the peril of theft in accordance with an embodiment of the present invention. The first column lists various options available to the customer. As discussed above, the customer may select self-selected or system-generated options. Alternatively, a blended option may be offered where a combination of the self-selected and system-generated options are provided. In accordance with one alternative embodiment of the blended option, the process described in FIG. 4 includes, for example, both process paths as identified in steps 404 and 418. Regardless the type of option selected by the customer, the second column represents collection of information by the insurance company. This may take the form of an application (on-line, in-person, over the phone, etc.), surveys (on-site, phone, etc.), and third party sources of information. After this information has been gathered, a risk assessment is performed. If the system-generated option has been selected, the risk assessment includes using predictive modeling, historical experience, third party information and various factors associated with a specific peril. For the theft peril described in FIGS. 5a and 5b, some factors may include employee turnover, high-value items, geographic location, off-premise exposure, etc.

If the self-selected option has been selected, the risk assessment is performed largely by the customer. Accordingly, the customer is presented various options to reduce or eliminate risks associated with the peril, and the customer is directed to accept or decline the various options. With respect to the theft peril illustrated in FIGS. 5a and 5b, this may include tracking, protective hardware, training, etc.

Once the risk assessment has been performed, the last column of FIG. 5a illustrates the recommendations that are provided. If the system-generated option has been selected, various gaps may be identified and presented to the customer. Accordingly, various options for mitigating risks associated with the peril may be presented. With respect to the theft peril illustrated in FIGS. 5a and 5b, this many include recommendations for each of the risks associated with theft, such as high employee turnover, geographic area, high value items, etc. If the self-selected option is selected, the customer may merely be given a summary of the customer selections. Additionally, a premium and/or rating for the insurance policy may be generated based on the gathered information, risk assessment and recommendations.

Figure 6:
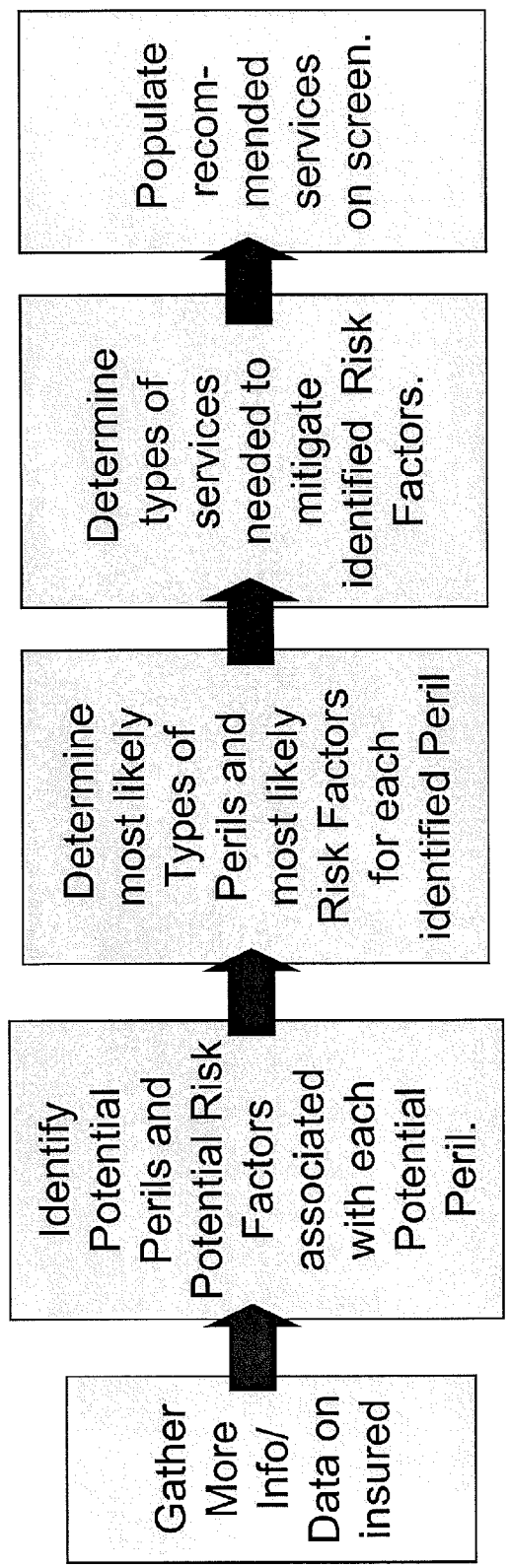
FIG. 6 shows a flow chart showing a method of generating recommended services according to an embodiment of the present invention.

FIG. 6 shows a high-level flow chart of an implementation of a system-generated option in accordance with an embodiment of the present invention. First, information is gathered regarding the insured. As described above, this may include survey, application, third-party and historical information. Next, the potential risk and associated risk factors are identified. Next, the likeliness of each associated risk for each peril is identified. The likeliness of each associated risk is used to determine the services that would effectively mitigate the identified risk factors. These are then used to generate the recommended services.

Figure 7:
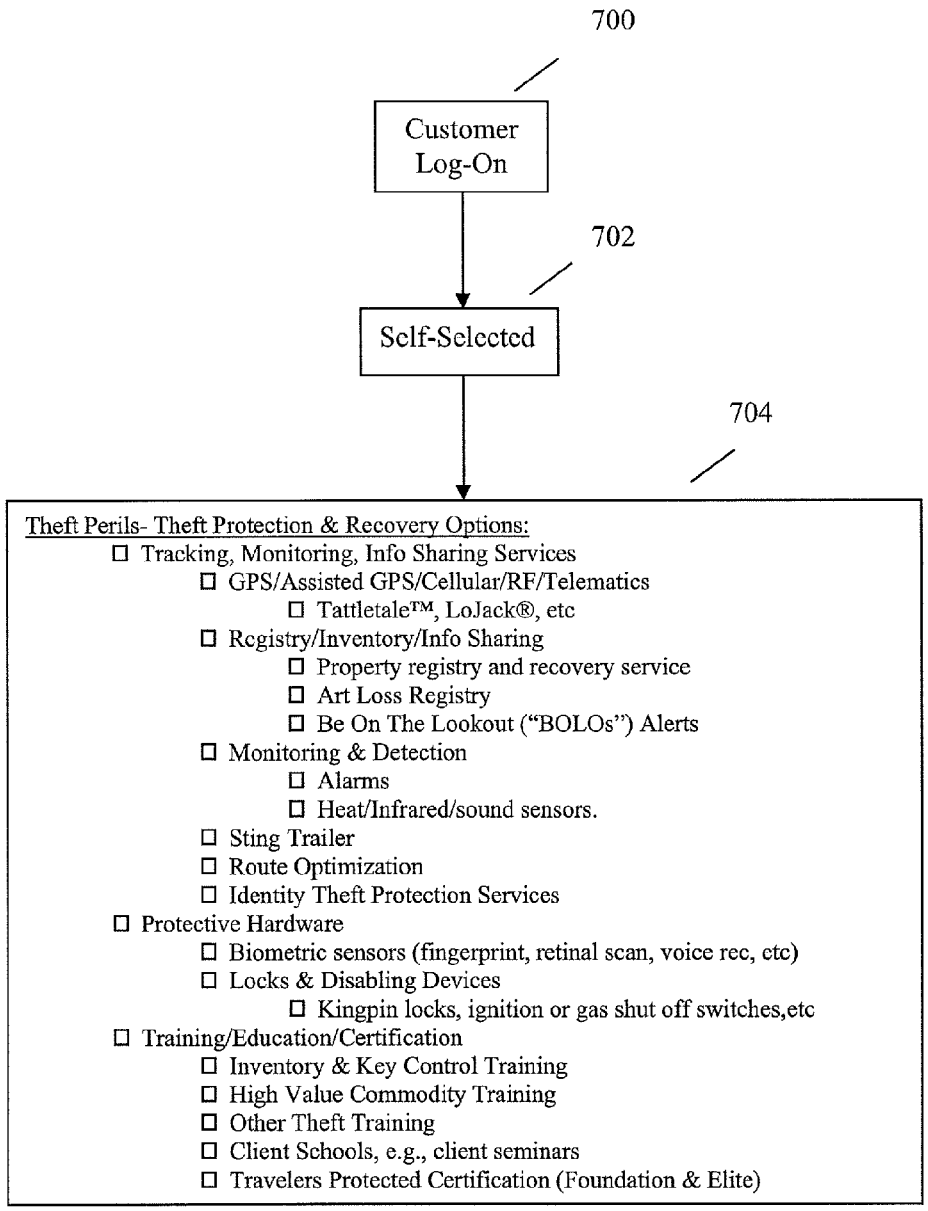
FIG. 7 shows a flow chart showing theft peril risk mitigation options according to an embodiment of the present invention.

FIG. 7 shows a flow of various risk factors that may be presented to a customer when the self-selected option has been selected for the theft peril in accordance with an embodiment of the present invention. As shown in FIG. 7, the customer may be presented various risk factors associated with the theft peril that is available to the customer (704). This may represent a "cafeteria-menu" of the available risk mitigation factors, and may include tracking/monitoring/information sharing, protective hardware, and training. Further, each of these categories may include subcategories. Although the various options are shown as radio buttons, other implementations are contemplated, such as drop-down menus, text inputs, graphical script-based applets, etc. Although not shown, the user may be presented similar options even if the system-generated option is selected. However, in the instance of the system-generated option, the customer may be presented a subset of these factors, or some of these factors (i.e., the recommended factors) may be pre-selected by the system.

Figure 8:
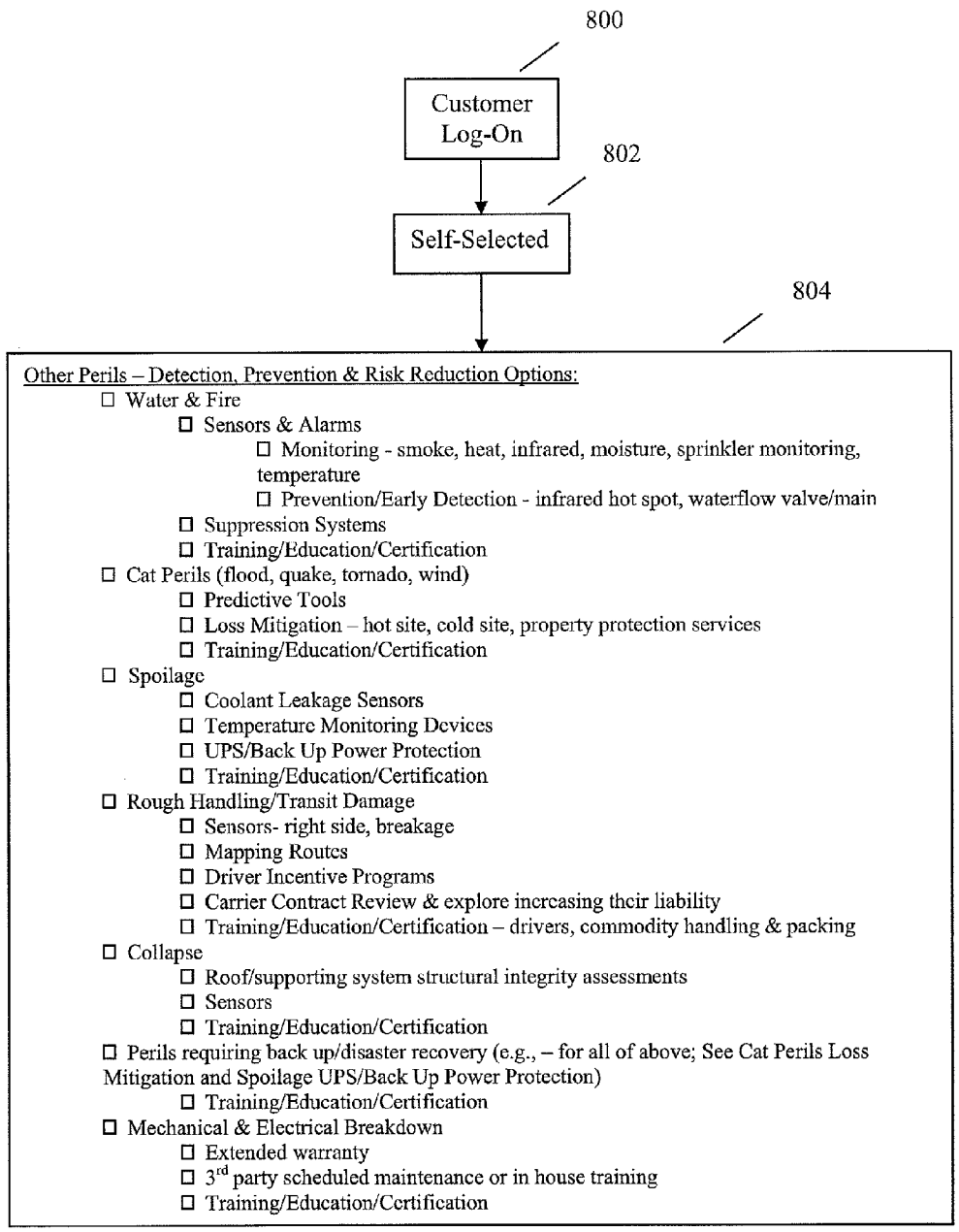
FIG. 8 shows a flow chart showing theft peril risk mitigation options according to an embodiment of the present invention.

FIG. 8 shows a flow of various risk factors that may be presented to a customer when the self-selected option has been selected for various other perils in accordance with an embodiment of the present invention. As shown in FIG. 8, the customer may be presented various risk factors associated with the theft peril that is available to the customer (804). This may represent a "cafeteria-menu" of the available risk mitigation factors for each peril. Although the various options are shown as radio buttons, other implementations are contemplated, such as drop-down menus, text inputs, graphical script-based applets, etc. Although not shown, the user may be presented similar options even if the system-generated option is selected. However, in the instance of the system-generated option, the customer may be presented a subset of these factors, or some of these factors (i.e., the recommended factors) may be pre-selected by the system.

FIG. 9 is an example of the parameters that can be selected to order and/or customize a sting trailer. These options may be presented to the user when the sting trailer option is selected (as shown in FIG. 7). Although FIG. 9 shows various options that are available to customers if the sting trailer option is selected, similar parameters may be available for each of the various other factors that are shown in FIGS. 7 and 8 and that may be selected by the customer. The sting trailer can be used with many types of insurance, including small business, medium business, large business, personal insurance, and bond or surety or any other type of insurance. The sting trailer can also be in different form factors including a trailer, a truck, a car, or a van or any other form factor that provides the desired results or functions described herein. This string trailer can be used at various frequencies, including one time, monthly, weekly, quarterly, and yearly or other custom selected times. The type of equipment it can include is audio video, location/GPS, RFID tags, sensors (e.g. glass breakage, smoke moisture/water/humidity, motion, temperature, or any other sensor that provides the desired results or functions described herein). Other custom features the string trailer can have are various colors, a company logo, or it can simply be blank, or other customer specified features. The cargo can be technology/electronics, fine art/jewelry, pharma/drug/health supplies, building supplies/materials, general retail, energy, equipment or any other item(s) capable of being used in a criminal sting operation. The sting trailer can be deployed to any specified city, and placed in the same location as other trailers. Also, the sting trailer may be provided by the insurance company and/or by a third party service provider which specializes in sting trailer design and/or deployment.

Figure 10:
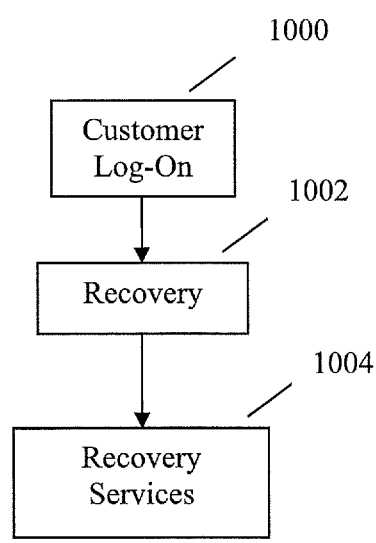
FIG. 10 shows a flow chart showing a loss recovery services option according to an embodiment of the present invention.

FIG. 10 shows a flow of a loss recovery services option in accordance with an embodiment of the present invention. As shown in FIG. 10, after the customer logs onto the portal, the customer may have the option of selecting a loss recovery services option. Selecting this option will enable the customer to initiate loss recovery. This may include opening an investigation into the loss, engaging law enforcement, engaging tracking or sensing technology, etc. Specific features of the loss recovery option in accordance with an embodiment of the invention is illustrated in FIGS. 11 and 12 and described below.

Referring to FIG. 11, an aspect of the invention may include a portal, which may also provide an expedited process for proactive recovery of a loss, such as stolen items, covered by the insurance policy. The insured (or user) enters the portal and goes to the Loss Recovery Request screen which prompts the user to enter the description, last know location of the lost items, as well as contact information. Once the information is entered, the user may click on the "Submit Request" button to initiate the loss recovery process. The portal sends the insurance company an electronic message via email, SMS/text, instant message, or any other communication technique, over a communication network. Upon receiving the request the insurance company proactively begins the recovery process using the information entered by the insured. Also, user may save the information for later submission by clicking the "Save" button. If the user wants to speak with the insurance company before or after a recovery request submission, he may click on the "Contact Insurance Company" button, which prompts the insurance company to call the insured on the number provided in the information section or opens a separate window (not shown) where the insured may chat on line with the insurance company loss recovery representative.

Referring to FIG. 12, after a loss recovery request has been submitted, the insured may track the recovery process by accessing the Loss Recovery Status screen. The screen has a section that shows the lost or stolen item for which the status is being provided. It also has a section showing various stages of the recovery process. Other or different stages may be provided if desired. Also, there may be a section that shows the status of sensing technology used to track the lost/stolen item. There are also buttons that allow the user to obtain realtime data feed from selected tracking sensors (for example, such as described in connection with FIG. 7 herein, or any other sensing technology) and a periodic tracking report of the loss item status.

Theft and/or risk mitigation analysis system is also connected to customers through the Internet (e.g. using a web based application) who are accessing the system using client system (e.g. a web browser). Theft and/or risk mitigation analysis system is also connected to security monitoring components which receives data from the various theft and/or risk mitigation technologies being used. For example, monitoring may be configured to receive alerts when a water level sensor indicates the presence of water in a warehouse. Theft and/or risk mitigation analysis system is also connected to internal systems such as underwriting and actuarial, and internal expertise, such as SIG.

It is to be understood that the embodiment(s) described above are not limited in its application to the details of construction and to the arrangements of the components set forth in the above description or illustrated in the drawings. The invention is capable of other embodiments and of being practiced and carried out in various ways. Also, it is to be understood that the phraseology and terminology employed herein are for the purpose of description and should not be regarded as limiting. For example, although the invention has been described in connection with inland marine insurance products and/or services and/or coverages, the present invention invention can apply to any type of insurance products and/or services and/or coverages.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

For example, the specific sequence of the above described process may be altered so that certain processes are conducted in parallel or independent, with other processes, to the extent that the processes are not dependent upon each other. Thus, the specific order of steps described herein are not to be considered implying a specific sequence of steps to perform the above described process. Other alterations or modifications of the above processes are also contemplated. For example, further insubstantial approximations of the above equations, processes and/or algorithms are also considered within the scope of the processes described herein.

We claim:

1. A loss mitigation computer system, comprising:
   a computer-implemented customer interface, executed by at least one computer system having at least one computer processor, electronically receiving customer specific information data from an insurance customer computer system via a communications network;
   a risk assessment computer processing module, executed by the at least one computer processor, processing the customer specific information data and identifying at least one peril comprising at least one theft and damage responsive to the customer specific information data;
   a risk mitigation computer processing module, executed by the at least one computer processor, generating at least one risk mitigation option based on the at least one peril, transmitting the at least one risk mitigation option to the insurance customer computer system, and receiving at least one customer selected risk mitigation option responsive to the generated at least one risk mitigation option from the insurance customer computer system; and
   a customization computer processing module, executed by the at least one computer processor, generating at least one of a calculated insurance premium, a current risk assessment, a future risk assessment, recommendations, and a gap analysis based on the received at least one customer selected risk mitigation option.

2. The loss mitigation computer system as recited in claim 1, further comprising a data collection interface, executed by the at least one computer processor, electronically compiling additional data, and wherein the risk assessment computer processing module processes the additional data and identifies the at least one peril based on the customer specific information data and the additional data.

3. The loss mitigation computer system as recited in claim 2, wherein the additional data includes at least one of third-party data, loss experience data, resources available data, exposure data, interdependencies data, location and off-premise data, and transit data.

4. The loss mitigation computer system as recited in claim 1, wherein the risk assessment computer processing module includes predictive modeling.

5. The loss mitigation computer system as recited in claim 1, wherein the user interface includes at least two selectable configuration settings.

6. The loss mitigation computer system as recited in claim 5, wherein the at least two configuration settings include a self-selected setting and a system generated setting.

7. The loss mitigation computer system as recited in claim 6, wherein the at least one risk mitigation option is customized by the risk mitigation computer processing module based on the customer specific information data when the system generated setting is selected.

8. The loss mitigation computer system as recited in claim 6, wherein at least one of the at least one risk mitigation option is pre-selected by the risk mitigation computer processing module based on the customer specific information data when the system generated setting is selected.

9. The loss mitigation computer system as recited in claim 1, wherein the gap analysis includes at least one recommended risk mitigation option.

10. The loss mitigation computer system as recited in claim 1, wherein the at least one risk mitigation option includes at least one of a mobile sting trailer, tracking, monitoring, a global positioning system, a radio frequency device, a telematics device and recovery services.

11. The loss mitigation computer system as recited in claim 1, wherein the customer specific information data includes at least one of type of business, product data, route data, and location data.

12. The loss mitigation computer system as recited in claim 1, wherein the at least one risk mitigation option includes at least one of security, monitoring, predictive tools, prevention, training and education, tracking, protective hardware, back-up, and suggested routes.

13. The loss mitigation computer system as recited in claim 1, further comprising a loss recovery computer processing module, executed by the at least one computer processor, processing and initiating at least one loss recovery mechanism.

14. A computer implemented method for mitigating loss, the method comprising:
   electronically receiving customer specific information data from an insurance customer computer system via a communications network;
   processing, by a computer, the customer specific information data and identifying at least one peril comprising at least one of theft and damage responsive to the customer specific information data;
   generating, by the computer, at least one risk mitigation option based on the at least one peril, transmitting the at least one risk mitigation option to the insurance customer computer system, and receiving at least one customer selected risk mitigation option responsive to the generated at least one risk mitigation option from the insurance customer computer system; and
   generating, by the computer, at least one of a calculated insurance premium based on the at least one received customer selected risk mitigation option and a gap analysis based on the received at least one customer selected risk mitigation option.

15. The method for mitigating loss as recited in claim 14, further comprising compiling, by the computer, additional data, and wherein the processing includes processing the additional data and identifying the at least one peril based on the customer specific information data and the additional data.

16. The method for mitigating loss as recited in claim 15, wherein the additional data includes at least one of third-party data, loss experience data, resources available data, exposure data, interdependencies data, location and off-premise data, and transit data.

17. The method for mitigating loss as recited in claim 16, wherein the computer user interface includes at least two selectable configuration settings.

18. The method for mitigating loss as recited in claim 17, wherein the at least two configuration settings include a self-selected setting and a system generated setting.

19. The method for mitigating loss as recited in claim 18, wherein the at least one risk mitigation option is customized based on the customer specific information data when the system generated setting is selected.

20. The method for mitigating loss as recited in claim 19, wherein the gap analysis includes at least one recommended risk mitigation option.

21. The method for mitigating loss as recited in claim 14, further comprising applying, by a computer, predictive modeling in at least one of generating the at least one risk mitigation option, generating the calculated insurance premium, and generating the gap analysis.

22. The method for mitigating loss as recited in claim 14, further comprising processing and initiating at least one loss recovery mechanism or loss recovery service.

23. The method for mitigating loss as recited in claim 14, wherein:
   said at least one risk mitigation option comprises at least one predictive risk mitigation option;
   said generating, by the computer, further comprises generating based on the at least one peril using predictive modeling the at least one predictive risk mitigation option,
   said transmitting further comprises transmitting the at least one predictive risk mitigation option to the customer computer system,
   said receiving further comprises receiving at least one customer selected predictive risk mitigation option responsive to the at least one predictive risk mitigation option from the customer computer system; and
   said generating, by the computer, further comprises generating at least one of a calculated insurance premium based on the at least one customer selected predictive risk mitigation option and a gap analysis based on the received at least one customer selected predictive risk mitigation option.

* * * * *